United States Patent [19]
Mistarz et al.

[11] 3,744,212
[45] July 10, 1973

[54] AUTOMATIC PLASTIC BOTTLING SYSTEM AND METHOD
[75] Inventors: Robert J. Mistarz, Northbrook; Albert B. Mojonnier, Sr., Chicago, both of Ill.
[73] Assignee: Koehring Company, Milkwaukee, Wis.
[22] Filed: June 17, 1971
[21] Appl. No.: 154,058

[52] U.S. Cl. .......................... 53/29, 53/37, 53/183, 53/281
[51] Int. Cl. ........................ B65b 3/02, B65b 7/28
[58] Field of Search .................. 53/29, 37, 40, 183, 53/279, 281, 282; 156/69, 182, 539, 556, 567

[56] References Cited
UNITED STATES PATENTS
3,453,803    7/1969    Mojonnier ............................ 53/183

*Primary Examiner*—Robert L. Spruill
*Attorney*—Andrew J. Beck et al.

[57] ABSTRACT
A method and apparatus for performing a plurality of successive processing operations with individual container sections or joined container sections forming containers. The processing operations include the dispensing of container sections and the assembly, filling and sealing of the containers. On a single platform, a plurality of spaced processing units are rotatably mounted. Each unit includes a plurality of circumferentially spaced carrier stations for moving container sections or containers about the unit axis of rotation. A plurality of spaced star wheel transfer units are disposed intermediate and adjacent the processing units. The star wheels receive container sections or containers from and deliver them to the processing units at transfer zones defined generally tangentially of each of the processing units and an adjacently disposed star wheel unit. The transfer unit is rotatably mounted on the platform and includes a plurality of circumferentially spaced carrier stations for moving the container sections or containers about the axis of rotation. The circumferential spacing of said carrier station on the transfer and processing units is substantially the same throughout; and the transfer and processing units are geared together for simultaneous rotation, with said carrier stations of each of the processing units and an adjacently disposed transfer unit rotating in opposite angular directions. The initial processing units are comprised of first and second denesters for supplying individual container sections to an adjacent transfer unit.

8 Claims, 10 Drawing Figures

AUTOMATIC PLASTIC BOTTLING SYSTEM AND METHOD

CROSS REFERENCE TO RELATED APPLICATIONS

The disclosure of this application is related to the following applications of the present inventors each filed in the U.S. Pat. Office on June 17, 1971: Ser. No. 154,062 entitled "Heat Sealing Apparatus and Method"; Ser. No. 154,061, entitled "Trapped Cam Assembly"; Ser. No. 154,060, entitled "Pedestal Assembly" and Ser. No. 154,079, entitled "Jaw Operated Cup Dispensing Mechanism and Method".

BACKGROUND OF THE INVENTION

This invention relates to an automatic bottling system for processing thermoplastic containers. The invention relates particularly to a machine which dispenses container sections and successively forms, fills and seals the container while maintaining constant spacing and orientation between container sections and containers, as well as intermeshing gear drive throughout, with the processing stations being compactly interrelated on one platform.

Machines for performing various processing operations at relatively remote locations have long been employed in container making. For example, in U.S. Pat. No. 3,499,068 issued to G. W. Brown and U.S. Pat. No. 3,297,504 issued to G. W. Brown et al. there are shown method and apparatus for assembling and joining thermoplastic container sections by friction welding. Devices of this type may be successfully employed to economically assemble containers and deliver them to packing stations. These devices are characterized by rotating spin welders which utilize star wheel transfer means to successively feed in container portions and feed out joined containers. The star wheel transfer devices are generally chain driven from the same power source that rotates the spin welding apparatus. A chain drive conveyor of substantial length is utilized to feed container portions from a remote supply station to the input star wheel device.

It can be appreciated that devices of this type due to the relatively long distances involved between assembly and delivery points may present problems in high speed assembly operations. Conveyors utilized for initial feeding of relatively lightweight thermoplastic container portions have a tendency to permit random container orientation during transfer to the star wheel transfer device. Non-uniform longitudinal spacing may occur between container portions longitudinally traveling along the conveyor, and lateral orientation of the containers relative to the side walls of the conveyor may differ throughout. As will be appreciated, orientation and spacing problems may in turn create problems in the transfer of container portions by the star wheel.

Additionally, the chain drives previously employed in the above-referenced patents require a number of driving sprockets and interconnecting shaft assemblies to span the relatively long distances between the conveyor, the star wheels, and the main drive of the spin welder. Chain drives, as can be appreciated, also present certain problems with respect to cleanliness and noise level. In this connection, it should be noted that when joining and filling milk containers, it is of the utmost importance to provide a system which is easy to clean and maintain especially in light of the rigorous standards of cleanliness maintained in the milk industry.

U.S. Meyer Pat. No. 2,500,465 relates to a bottling machine for combining both bottle filling and capping operations thereon without the use of long chain driven conveyors therebetween. Also featured is the use of a gear train rather than a chain drive to transfer rotational movement from a central drive to devices from moving bottles in particular paths. Star wheels are utilized at transfer stations between the filling and capping operations for maintaining the same linear speed and circumferential spacing between the transferred bottles. It should be noted that this system utilizes a relatively long input conveyor which has no device for positively maintaining the spacing between bottles or containers or for stabilizing the bottles being fed into the star wheel transfer device against tipping and cocking. Such features are particularly important throughout systems involving successive processing operations including container element dispensing and container forming, filling and sealing.

SUMMARY OF THE INVENTION

Recognizing the desirability of providing a system for performing a plurality of successive processing operations including dispensing of container sections and forming, sealing and filling containers, it is a general object of the present invention to provide a system wherein even spacing and alignment of the container sections and containers is maintained throughout the system so that the system is particularly amenable to high speed operation.

It is a particular object of the present invention to provide such a novel system characterized by rotatable processing units and rotatable transfer means throughout with these processing units and transfer means being geared to one another to provide smooth transfer of the container means.

It is a further object of the present invention to provide such a novel system wherein the processing units and transfer means are compactly incorporated on a single platform.

It is a still further object of the present invention to provide such a system wherein the initial rotatable processing units provide the input of the container sections by individually dispensing the same.

A preferred embodiment of the invention intended to accomplish at least some of the foregoing objects comprises a machine for performing a plurality of successive processing operations with container means comprised of individual container sections or joined container sections forming containers. The processing operations include the dispensing of container sections and the assembly, filling, and sealing of the containers. A plurality of processing means are provided for performing these processing operations. Each processing means is comprised of a processing unit rotatably mounted on a platform and including a plurality of circumferentially spaced carrier stations. The carrier stations are employed for moving the container means about the axis of rotation of the associated one of the processing units.

Disposed intermediate adjacent the processing units are a plurality of spaced transfer means for receiving the container means from and delivering the container means to the processing units at transfer zones. These transfer zones are defined generally tangentially of each of the rotatable processing units and adjacently disposed ones of the rotatable transfer means. Each transfer means is rotatably mounted on the platform and also includes a plurality of circumferentially spaced carrier stations for moving the container means about the axis of rotation of the associated one of the transfer means.

The circumferential spacing of the carrier means on each of the transfer means and the processing unit is substantially the same.

Each of the transfer means and the processing units are geared together by gear means for simultaneous rotation. This gearing is accomplished such that the carrier stations of each of the processing units and an adjacently disposed transfer means rotate in opposite angular directions.

Initial ones of the processing units are comprised of first and second dispensing means for supplying individual container sections to an adjacent one of the transfer means. The first and second dispensing means respectively supply upper and lower container sections to that transfer means.

Preferably each of the transfer means is comprised of a rotatable star wheel transfer means. The rotatable star wheel transfer means which cooperates with the first and second dispensing means is comprised of superposed star wheel transfer sections for respectively and successively receiving the upper and lower container sections in superposed relationship. These superposed star wheel transfer sections are in turn comprised of superposed container means receiving plates, and the carrier stations are provided by superposed sets of generally semi-circular cutouts defined in the periphery of the receiving plates.

Supply of the upper and lower container sections by the first and second dispensing means is accomplished by means for supplying the container sections to the adjacent transfer means for generally vertical nests of container sections. The carrier stations on one of the dispenser means is comprised of generally vertical movable vacuum operated means for denesting the container sections.

The denested upper and lower container sections are transferred to a spin welder and there joined together to form a container. A further star wheel transfer means is employed to transport the container from the spin welder to a container filler. The filled container is in turn transferred by star wheel transfer means to a heat sealer for closing the container. Thereafter a final star wheel transfer means transports the container to a delivery conveyor.

Other objects and advantages of the present invention will become apparent from the subsequent detailed description of a preferred embodiment thereof and considered in connection with the accompanying drawings in which:

DETAILED DESCRIPTION OF THE PREFERRED EMBODIMENT

Figure 1:
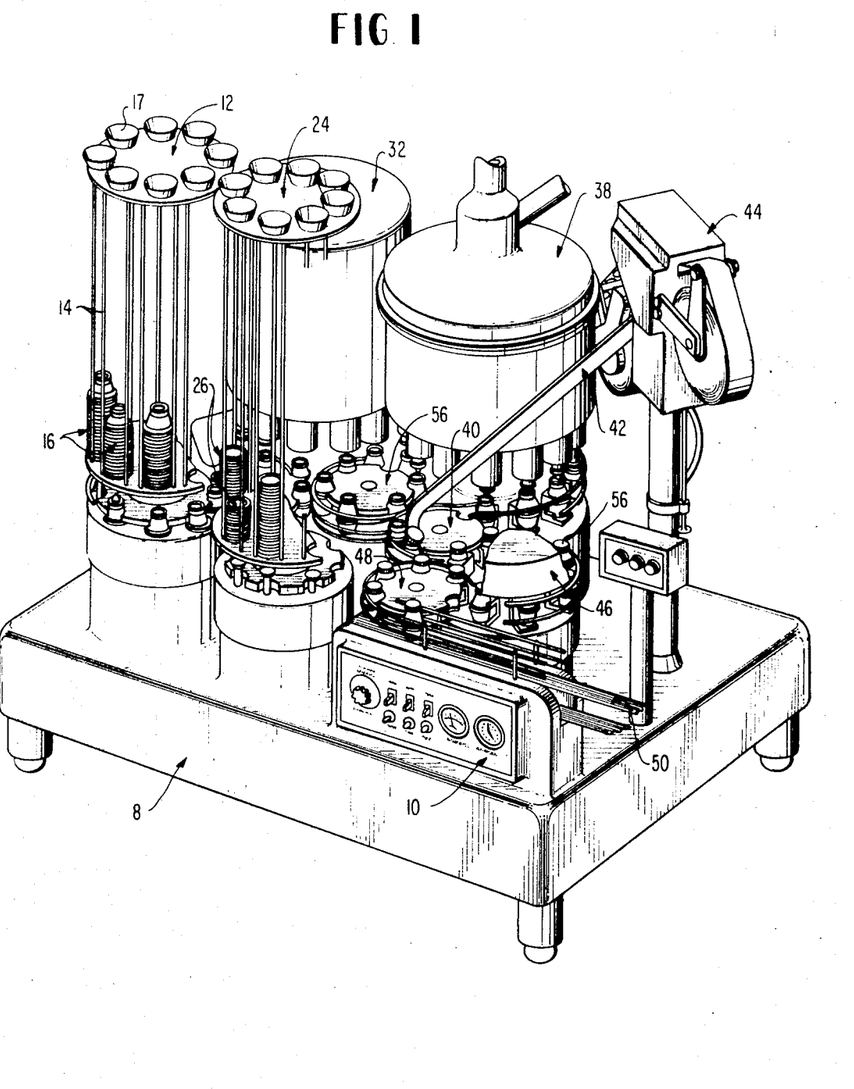
FIG. 1 is a perspective view of a machine for dispensing upper and lower plastic container halves from nested stacks thereof in accordance with the invention, joining these container halves together to make milk containers, filling the containers, and affixing caps onto the tops of the containers.
Figure 2:
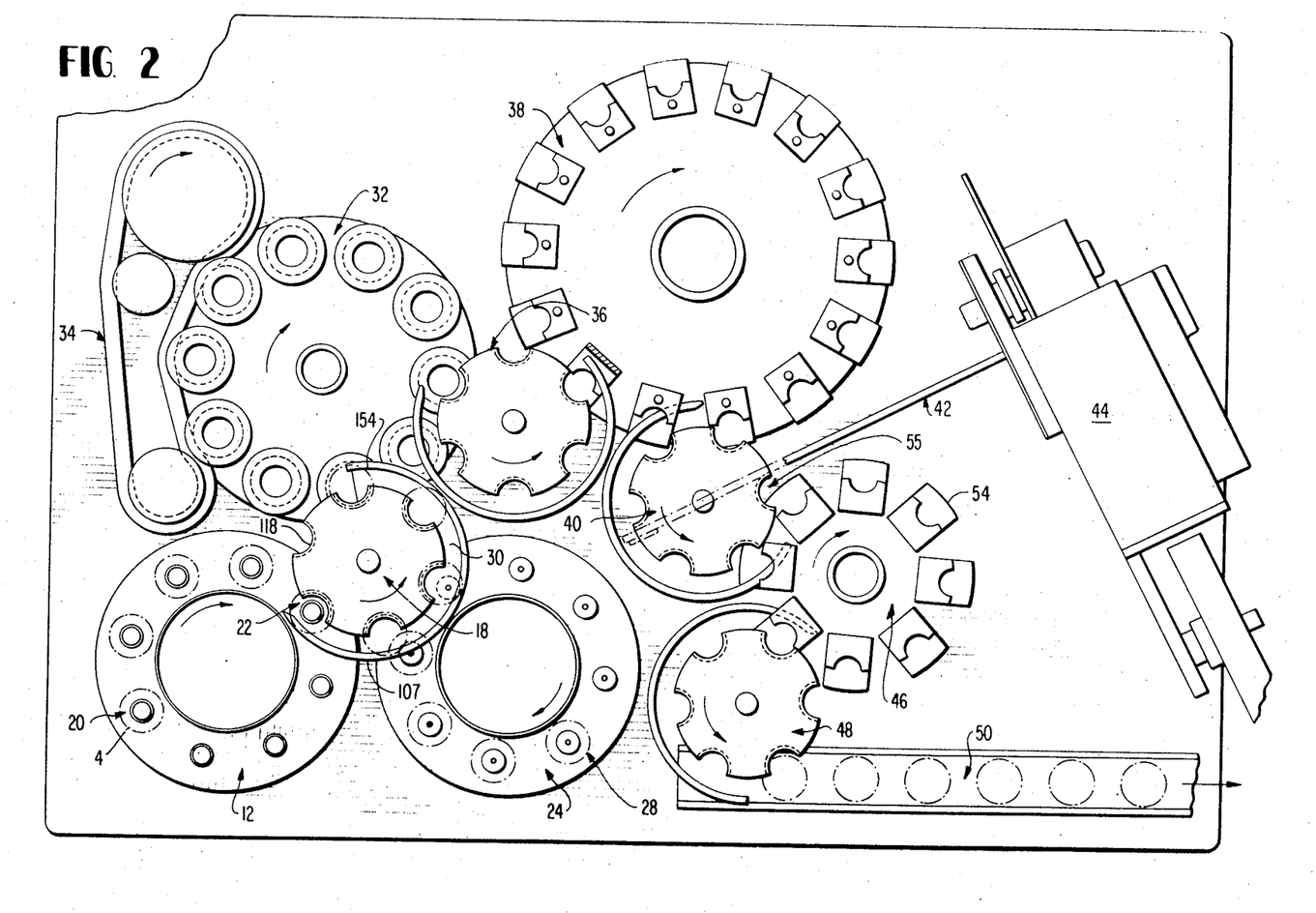
FIG. 2 is a somewhat diagrammatic plan view of the machine of FIG. 1.
Figure 3:
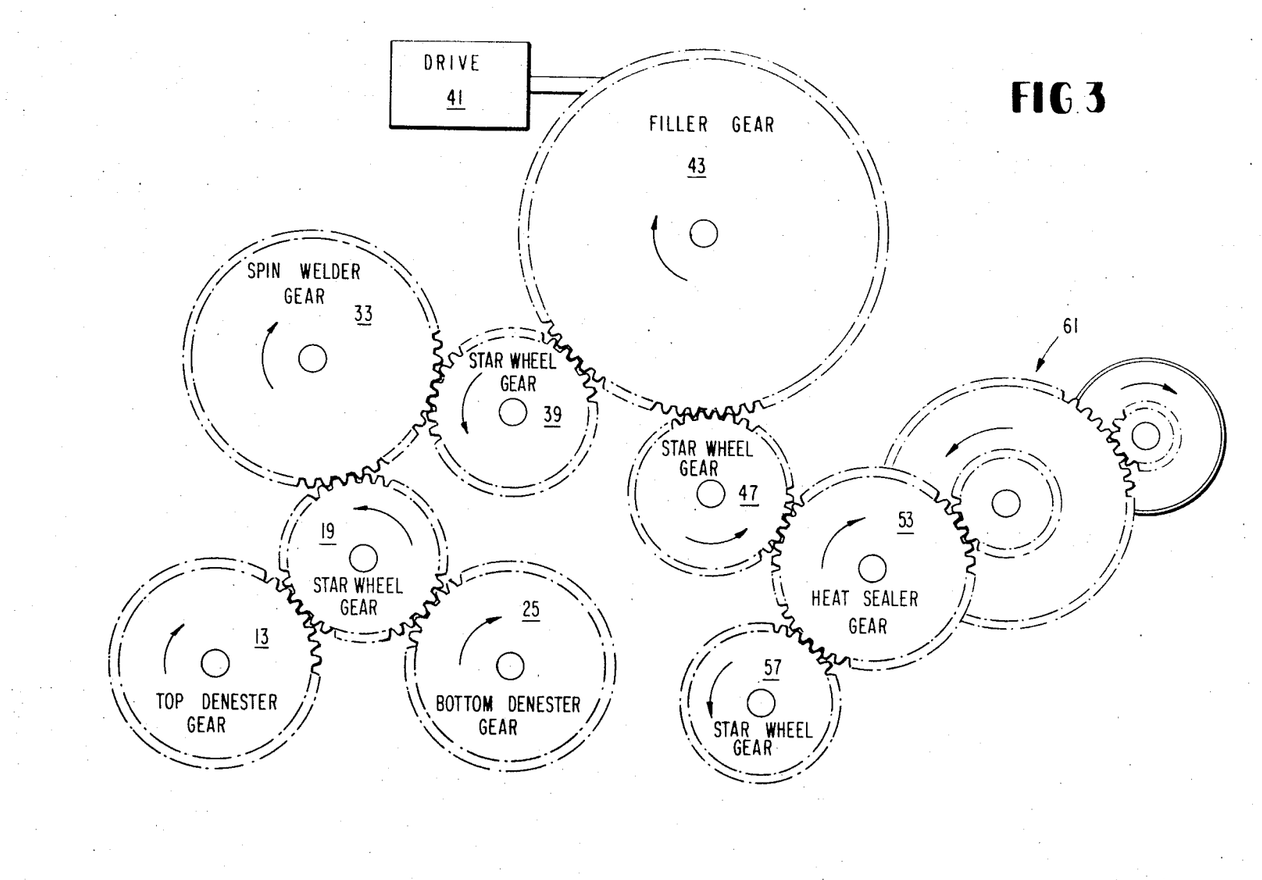
FIG. 3 is a somewhat diagrammatic view showing the intermeshing gearing used in the machine of FIG. 1.

It will be helpful at the outset to describe generally the overall construction and operation of a milk bottling machine of the invention. Such a compact machine is illustrated in FIGS. 1, 2, and 3. This machine assembles plastic containers with bulk supplies of nested container halves, fills the containers, and caps and seals the open tops of the filled containers. The various constructional and operational features of the machine are disclosed in more detail subsequently when each processing unit operation will be described and are disclosed in the several patent applications referred to above and the disclosure of each of them is incorporated herein by reference.

The containers are of configurations generally similar to that shown in U.S. Design Pat. No. D204,170, and indicated at 2 in FIGS. 7 and 8. These containers are assembled from separately fabricated container top halves 4 and container bottom halves 6, with the two halves of each container being frictionally welded together at the middle of the container.

The machine is in the form of a base or table structure 8 carrying thereon a control panel 10, a series of processing units and means for transferring the container portions to and from the various processing units. The processing units and the transfer means are driven by intermeshing gears (see FIG. 3) corresponding in location to the configuration shown in FIG. 2. Preferably a single drive unit may be employed to impart rotational movement to each drive gear and to each corresponding processing unit and transfer means. Also, the pitch line circles of the intermeshing gear drives shown in FIG. 3 preferably are in alignment with the circles formed by joining the centerlines of the container halves and containers as they travel throughout the system. The processing units are all rotatable units, and transfers between units are accomplished through rotating star wheels, permitting the compact and efficient arrangement indicated in FIG. 1 of the drawings.

The first processing unit of interest is that which supplies container top halves 4. This container top half supply unit or denester 12 includes means for holding eight vertical stacks of nested container top halves 4 and for delivering container top halves therefrom, one at a time, for subsequent processing. As illustrated, groupings of vertical rods 14 establish the outlines for the several stacks 16 of nested container top halves. Additional container top halves may be supplied to each of the stacks 16 through funnel means 17 at the top of the unit 12. The several stacks 16 are arranged in a circle and the whole is rotated about the axis of this circle by a denester drive gear 13.

Means located below the stacks 16 of nested container top halves operate at one angular portion of the circle to remove the bottom container from each stack as that stack passes through such portion. Then the removed container top half is transferred from the top denester unit 12 onto a star wheel device 18. This sequence is indicated in FIG. 2, wherein the top denester unit 12 is shown to be rotating in a clockwise direction and where a container top half portion 4 is indicated to have been removed from the bottom of one of the container stacks at location 20 and transferred from the top denester 12 to the star wheel 18 at another angular location 22. The star wheel 18 is driven by a drive gear 19.

The container bottom halves are supplied from a unit 24 which is similar in its functions to the top container half supply unit or denester 12. Here again eight stacks 26 of nested container bottom halves 6 are located in a circular path and the stacks are revolved about the axis of this circle. Rotation is imparted through a drive gear 25 coupled to the rotating denester 24 (FIG. 3). As indicated in FIG. 2, the bottom denester 24 rotates in a clockwise direction, a container bottom half 6 is removed from the bottom of each stack 26 as that stack rotates past an angular location 28, and the individual container bottom halves 6 are transferred to the star wheel 18 in the zone of tangency between the units.

The star wheel 18 is of course a dual level device. The container top halves 4 are moved along an intermediately located support surface 30, while the container bottom halves 6 are disposed below the surface 30 but in vertical alignment with corresponding ones of the container top halves 4.

As the star wheel 18 rotates in a counterclockwise direction, it brings the vertically aligned container halves to a spin welder unit 32. Here the container halves 4 and 6 are received on individual holders and moved clockwise about a circular path being driven by gear 33. During one angular portion of this path, the holders for the container bottom halves are brought into contact with a drive belt 34 which serves to spin at high velocity about its own axis each of the container bottom halves which are captured within the holders. During this same time interval, the top edge of the container bottom half and the bottom edge of the container top half are brought together vertically into abutting relation. Since the container top half is not rotating about its own axis but a container bottom half is rotating in this fashion, a great deal of heat is generated by friction as the edges come into contact with each other. This heat serves to weld the thermoplastic material and provide a strong leakproof joint between the container edges at a location approximately in the middle of the joined container.

The joined container halves remain on the spin welder unit 32 for a sufficient time to permit adequate cooling of the newly formed joint. Then the containers are transferred one by one onto a star wheel unit 36 which delivers them to a filler unit 38. This star wheel unit is driven by gear 39.

The filler unit also is a rotating processing assembly. It receives the open topped containers at uniformly spaced locations about its periphery and revolves the containers through an arcuate path. A supply of the material, such as milk, to be introduced into the containers is located above the container support level of the unit, and as the containers move about the central axis of the unit they are raised individually into operative relationship to filler nozzle means which also rotate about the axis of the unit and which are disposed in vertical alignment with the container support stations. As each container is brought into operative relationship to the overlying filler nozzle, a measured portion of milk begins to flow into the container. The time during which the container is allowed to remain in operative relationship to the filler nozzle may, for example, serve to establish the quantity of milk introduced into the container. Thereafter, the container is lowered from contact with the filler nozzle and transferred from the filler unit 38 to another star wheel device 40. The main drive unit 41 in the preferred embodiment rotates the filler gear 43 which in turn drives all of the gears in the train.

While under the control of the star wheel device 40, driven by gear 47, each of the now filled containers passes beneath the end of a container closure or cap supply device 42. This device 42 receives caps formed in a mechanism 44 and disposes one such cap over the open top of each of the filled containers. The mechanism 44 is synchronously controlled by the gears indicated generally at 61.

The filled containers with the caps resting thereon then move one by one onto the periphery of a heat sealer unit 46. Each container moves clockwise about the central vertical axis of the heat sealer unit 46. It may be here noted that each filled container is supported during such movement so as to prevent tipping and misalignment, and that each container cap is brought into contact with a heater to cause the cap to be sealed to the remainder of the top opening in the thermoplastic container. The sealer is rotated by gear 53.

Thereafter, the sealed filled containers are delivered from the heat sealer unit 46 onto a star wheel device 48 driven by gear 57, and transferred to a delivery conveyor 50. The delivery conveyor 50 carries the filled and sealed containers to another location for such further processing as may be desirable in arranging them for shipment or the like.

Having described generally the overall arrangement and operation of the bottling machine of FIGS. 1, 2, and 3, it will be helpful to refer now to the constructional features of the individual processing means, including the rotational processing units 12, 24, 32, 38 and 46 illustrated in greater detail in FIGS. 4–10 of the drawings.

Figure 4:
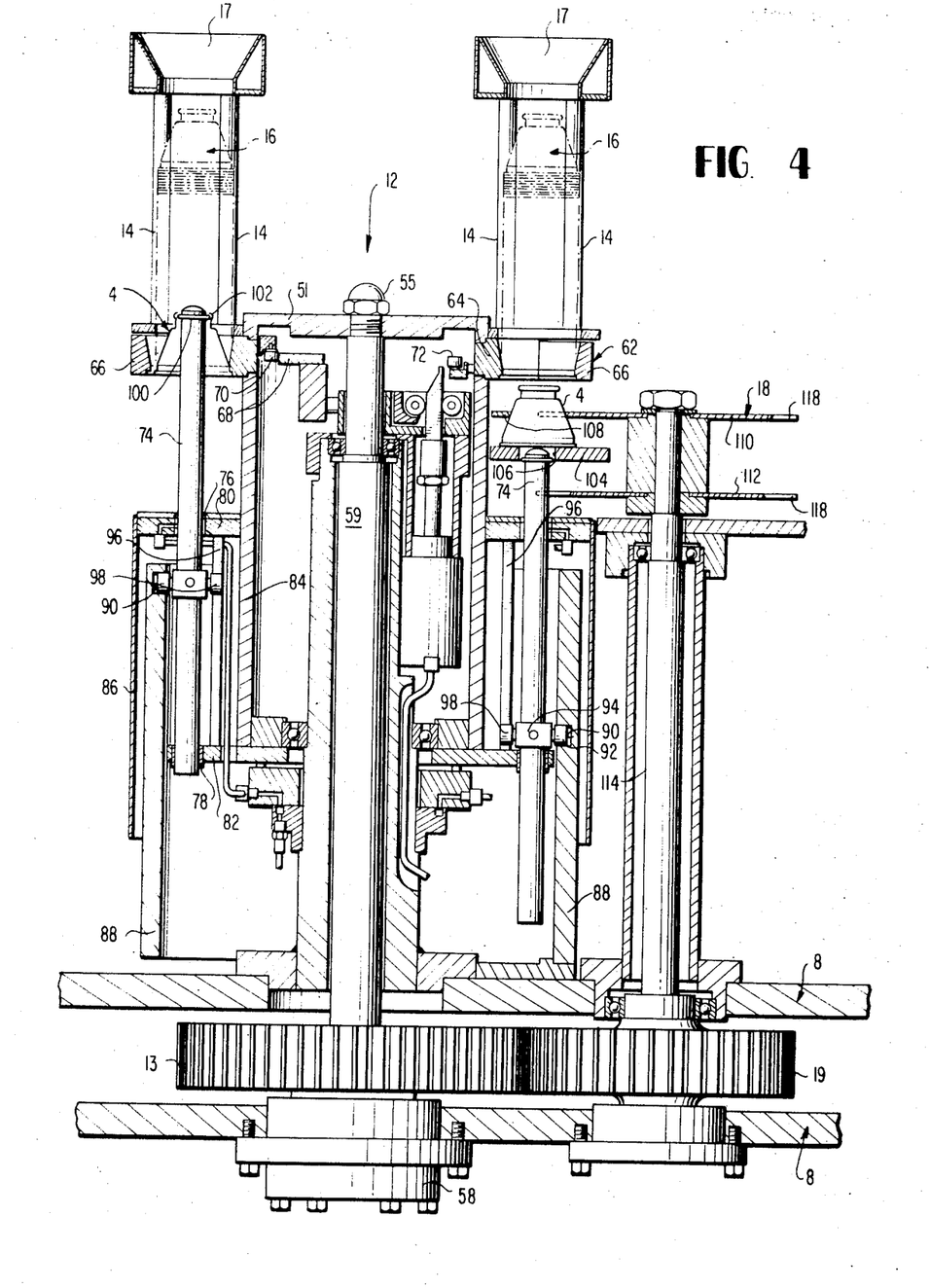
FIG. 4 is a vertical cross sectional view through the container top half dispensing unit of the machine of FIGS. 1 and 2.

Referring particularly to FIG. 4 of the drawings, it will be seen that the rods 14 which form the guides for the stacks 16 of upper container halves 4 are carried by a platform 51 secured by screw thread means 55 to the upper end of a rotating shaft 59. Bearing means located within a bearing housing 58 serve to mount the shaft 59 for rotation on the frame means 8 of the machine, and a lower end portion of the shaft 59 has a drive gear 60 secured thereon.

The container top halves 4 taper vertically and they are open at both of their ends. These cup-like articles are arranged in the several stacks 16 with their smaller ends directed upwardly.

The larger, lower, end portion of the lowermost container 4 in each stack 16 is normally gripped by jaw means designated generally by the numeral 62. Similar jaw means are employed in the container top half supply means. It will be helpful at this point to note that the jaw means for each stack of cup-like articles includes an inwardly disposed jaw member 64 carried by the rotating platform 51 and an outwardly disposed jaw member 66 which is movable radially with respect to the jaw member 64.

The movements of the jaw member 66 relative to the jaw member 64 are brought about by cam means 68 which does not rotate with the shaft 59 and which is contacted by cam follower means 70, 72 connected to the movable jaws 66. During one portion of the path of a stack 16 about the axis of the central shaft 59, the cam follower means associated therewith will be out of contact with the cam means 68 and the movable jaw 66 associated therewith will be in gripping engagement with the large end portion of the lowermost container half 4 in the stack. Such a relationship is illustrated at the right in FIG. 4 of the drawings. During another portion of the path of each stack about the central axis on shaft 59, the cam follower associated therewith will be pressed outwardly by the cam means 68 and the movable jaw 66 will be moved radially outwardly as indicated at the left portion of FIG. 4. When a jaw 66 is moved outwardly relative to the corresponding jaw 64, the whole of the jaw means 62 on the container halves of the stack is released, and in the absence of some other instrumentality for supporting the stack, it would move downwardly through the space between the jaws 64 and 66.

Such uncontrolled downward movements of the container halves are undesirable, and the present invention makes provisions for receiving and controlling the container halves as they are released by the jaw means 62. A receiver means appropriate for the container top half dispenser of FIG. 4 is in the form of a vertically reciprocable rod 74, sometimes referred to in the art as a pecker. One such rod extends vertically beneath each of the stacks 16 of container upper halves, being mounted for vertical reciprocation by bearing means 76 and 78 carried by plates 80 and 82 attached to a vertical cylinder 84 rigid with the rotating platform 51 of the apparatus. A cylindrical shroud 86 is attached to the outer edge of the plate 80 and provides a cover for the mechanical parts associated with the peckers. Within the shroud 86 there is a stationary cylinder 88 which is rigidly mounted on the frame 8 and which has a cam groove 90 extending around its inner surface. A cam follower roller 92 is carried by a block 94 fixed on each pecker rod 74 and rides in the cam grooves 90. Since the level of the cam groove 90 above the base 8 changes as one proceeds about the axis of the central shaft 59, the cam follower rollers riding in this cam groove 90 are caused to move up and down as the stacks revolve about the axis of this central shaft.

The peckers 74 are prevented from rotating about their own axes so as to assure that the cam follower rollers 92 will not be displaced inadvertently from the stationary cam groove 90. To this end, means 96 is attached to the rotating bearing plate 80 and provided with vertical slots or openings adjacent the angular locations of the several bearings 76. These slots cooperate with follower rollers 98 on the blocks 94 attached to the peckers 74 and hold the peckers against substantial rotation about their own axes.

The upper end portion of each of the peckers 74 is provided with a radially protruded rim or ring portion 100 for cooperation with a groove-like configuration 102 near the small upper end of each container upper half 4. See in this connection the left portion of FIG. 4 where a pecker 74 has been elevated to bring its rim portion 100 into mating relationship with respect to groove 102 on the interior of the lowermost container half 4 of a stack 16.

The sequence of operations of the container top half supply unit 12 of FIG. 3 will now be reviewed for purposes of clarity. As the central shaft 59 rotates, each of the stacks 16 moves in a circular path about the axis of the shaft. As a given stack 16 moves away from the zone 22 (FIG. 2) of tangency between the supply unit 12 and the transfer star wheel 18, its jaw means 62 will be in a closed condition such as that indicated to the right in FIG. 4 and its receiver 74 will be in a lowered position without having any container top half associated therewith. However, continuation of the movement of this stack 16 along the circular path will bring the cam follower 92 into a rising portion of the cam track 90 and will bring the cam follower on the jaw means 62 into contact with the cam means 68. At about the location 20 (FIG. 2) the pecker lip 100 will have engaged the lip 102 in the lowermost container top half of the stack and the movable jaw 66 will have moved outwardly to release the grip of the jaw means upon the container half.

The pecker preferably is given an extra increment of upward motion during this period when it is initially supporting the stack 16. This extra increment of upward motion momentarily lifts the stack 16 relative to the guide rods 14 and permits the stack to readjust and realign itself in the guide means. Then the pecker begins its downward movement. The jaw means also begins to close, and the movable jaw 66 comes into gripping engagement with the lower end portion of the next container half in the stack just after the lower end of the container half on the pecker 74 has cleared the jaw means.

Upon continued rotation of the shaft 59, the pecker 74 with the container half thereon moves into cooperative relationship with respect to the upper surface of a platform 104 having an opening 106 therein for receiving the pecker 74. The pecker 74 moves downwardly through the opening 106, under the influence of the cam track 90, to bring the lower edge of the container half into contact with the upper surface of the platform 104. Upon continued downward movement of the pecker 74, the pecker ring 100 is disengaged from the container half groove 102 and the container half is ultimately freed from the pecker 74 as illustrated at the right in FIG. 4.

The freeing of the container top half 4 from the pecker 74 occurs at about the location 22 (FIG. 2) where the container top half moves into the zone of action of the star wheel 18. Stationary guide rails 107 are disposed upon the periphery of the star wheel 18, and an end portion of the upper one of these guide rails is designated 108 in FIG. 4. The inner surface of the end portion 108 of the upper guide rail 107 curves about the axis of the star wheel 18 and guides the dispensed container top half 4 off the supply unit 12 and onto the star wheel unit 18.

The star wheel unit 18 includes upper and lower rotatable plates 110 and 112 fixed to a rotatable shaft 114 rotatably mounted on the frame 8 of the machine. The shaft 114 is driven by a gear 19 which meshes with the gear 13 on the central shaft 59 of the container top half supply unit 12. As a result of this intermeshing gear relationship, the peripheries of the units 12 and 18 move at the same speed.

The peripheries of the upper and lower star wheel plates 110 and 112 have arcuate cutout portions 118 therein at intervals corresponding to the intervals between adjacent ones of the stacks 16 on the container top half supply apparatus 12. A dispensed container top half 4, such as that illustrated at the right in FIG. 4, is guided onto one of these cutouts 118 and moved by the upper star wheel plate 110 about the star wheel axis, with the bottom edge of the container top half being shifted off the platform 104 of the supply apparatus 12 and onto a platform 30 (FIGS. 2 and 4) of the star wheel device 18.

Figure 5:
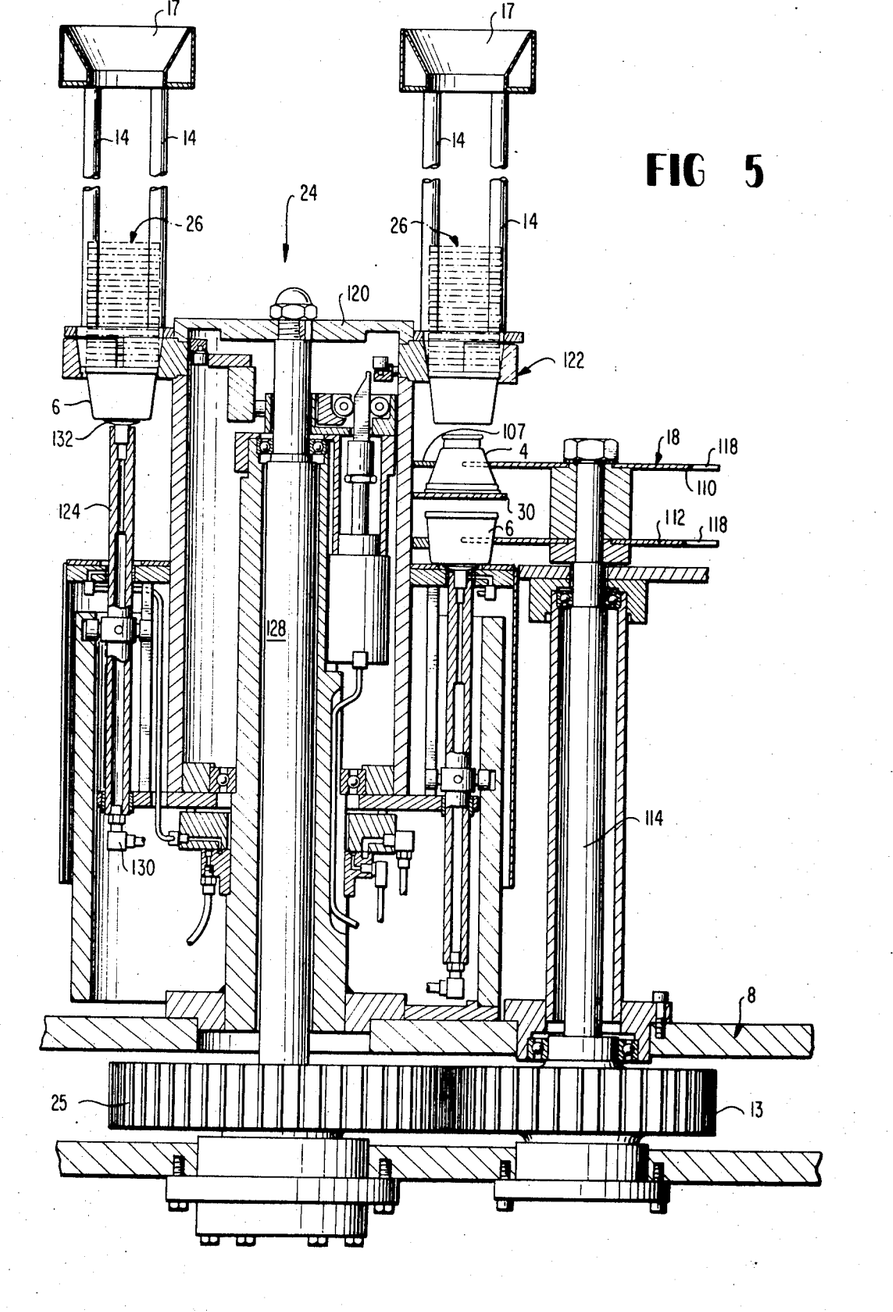
FIG. 5 is a vertical cross sectional view through the container bottom half dispensing unit of the machine of FIG. 1.

Container bottom halves 6 are supplied to the cutouts 118 in the lower star wheel plate 112 by the dispenser shown in detail in FIG. 5. This dispenser is similar in most respects to the dispenser 12 for the container upper halves. The unit 24 also includes stack guides 14 for locating vertical stacks 26 of nested container halves about a peripheral portion of a rotating platform 120, jaw mechanisms 122 for engaging and releasing the lowermost container halves in the stacks, and vertically reciprocable receivers 124 for the released container halves. The drive gear 25 on the main shaft 128 of the unit 24 meshes with the drive gear 13 for the star wheel device 18 to assure proper correlation of the speeds of the cooperating devices.

Referring again to FIG. 5, it will be observed that the container halves being dispensed by the unit 24 have shapes which are different from the container halves dispensed by the unit 12 of FIG. 4. The container bottom halves 6 supplied by the unit 24 have closed smaller ends, and they are arranged in the stacks 26 so that their smaller ends face downwardly.

It also will be observed that the container half receivers 124 in FIG. 5 differ from the peckers 47 of FIG. 4. The receivers 124 for the container lower halves are hollow shaft members having vacuum fittings 130 communicating with their lower ends and having substantially flat top stage portions 132 at their upper ends.

It will be noted that the stage portion 132 of a receiver 124 moves upwardly, under cam control similar to that of FIG. 4, to engage the bottom of a container lower half 6 as the jaw mechanism 122 immediately above that receiver opens. An extra increment of upward motion of the receiver 124 jostles the overlying stack 26 to permit readjustment of the stack within the guide 14, and then the receiver begins to move downwardly.

During this interval, vacuum is applied to the interior of the receiver 124 to attract the bottom of the container half 6 and hold it on the stage 132. Vacuum continues to be applied in this fashion at least until the engaged container half 6 reaches the area from which it is to be transferred to the star wheel device 18. The jaw mechanism 122 of course closes again after a small amount of downward movement of a receiver 124 to engage the large top edge of the next container half in the stack 26, and continued downward movement of the receiver with the vacuum applied separates the lowermost container half 6 from the stack.

Figure 6:
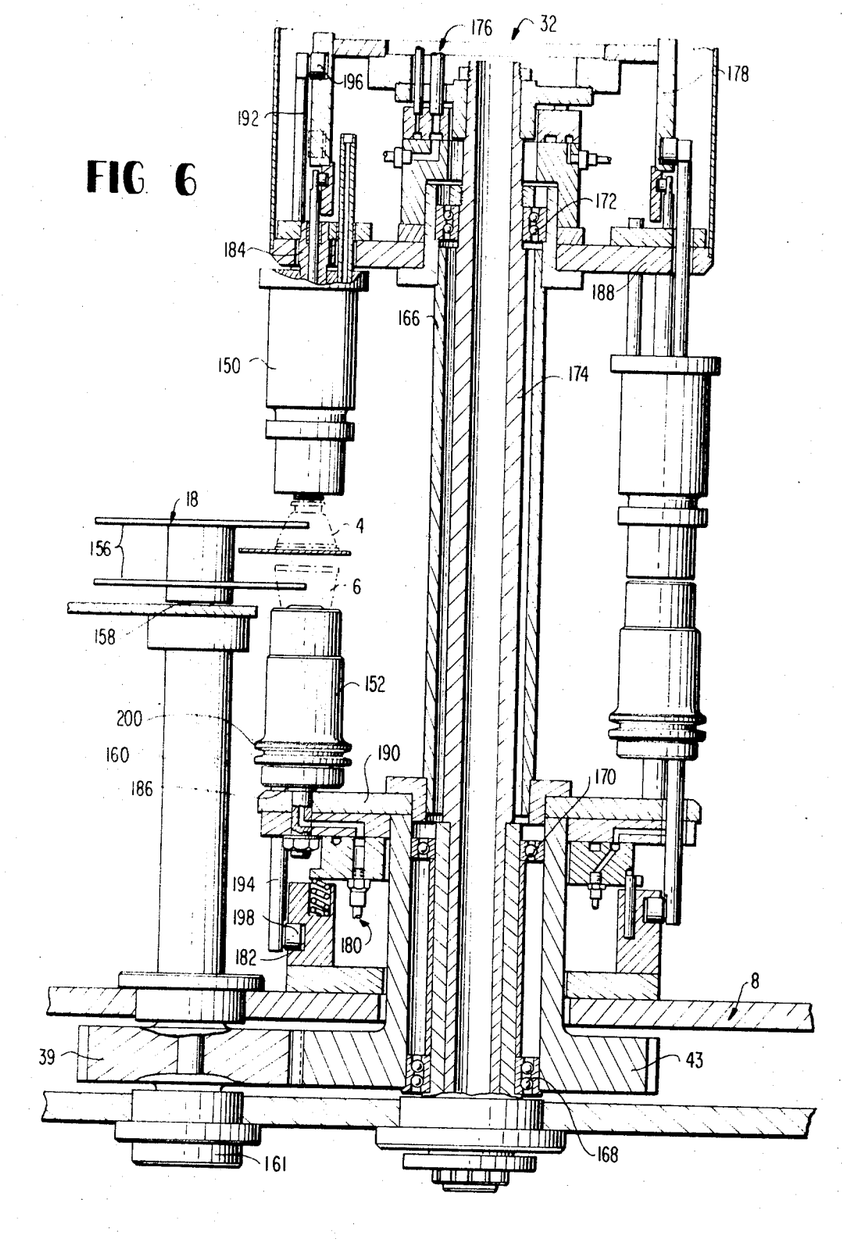
FIG. 6 is a vertical cross sectional view through the spin welding unit of the machine of FIGS. 1 and 2.

The upper and lower container halves 4 and 6, respectively, are delivered from the star wheel device 18 into alignment with the center lines of an upper cylindrical mandrel 150 and a lower cylindrical mandrel 152. The mandrels are mounted for movement in a circular path about the central axis of the spin welder 32 (FIG. 6). The transfer takes place at an angular zone where the star wheel periphery moves into a position of tangency to the path followed by the several upper and lower mandrels. This transfer is assisted by conventional stationary guide rails 154 as illustrated in FIG. 2. The end portions of the guide rails 154 intersect the path of the container halves on the star wheel 18 and cause the container halves to move onto the mandrels rather than permitting them to continue to move about the axis of the star wheel.

The star wheel device 18 includes upper and lower generally circular plates 156 having generally semicircular, evenly circumferentially spaced cutouts 118 at their peripheries for engaging the outer peripheries of the container halves 4 and 6. The cutout portions of the upper and lower plates are superposed and the pairs of superposed cutout zones comprise carrier stations of the star wheel device 18. The plates 156 are carried by a shaft 158 extending through a stationary cylindrical member 160 and being connected at its lower end portion to a drive gear 39. This shaft 158 is journalled within bearing means carried by the frame or table 8 and indicated generally at 161 in FIG. 6.

The spin welder drive gear 43 is attached to a hollow drive shaft 166 extending upwardly about the center of the spin welder unit 32. This hollow shaft is rotatable about bearing means 168, 170, and 172 which are located between a stationary vertical shaft 174 and the hollow drive shaft 166.

At its upper end the center stationary shaft 174 supports a stationary vacuum supply means generally indicated at 176 and an annular cam track 178. The platform 8 also has as a part thereof a vacuum supply shown generally at 180 and an annular cam track 182. The detailed operation wherein the cam tracks 178 and 182 are used will be subsequently described.

It would be helpful at this point to describe generally the spin welding operation to form a basis for the detailed description which follows. The container halves, once aligned with the center lines of the upper and lower mandrels 150 and 152, are surrounded by the mandrels for subsequent spinning. The mandrels rotate about the central axis of the spin welder 32 and also move vertically toward each other when surrounding the container halves. The lower mandrel 152 which surrounds the bottom half additionally rotates about its own axis during the spinning operation. Once the container halves are frictionally welded, the mandrels are caused to separate and free the surrounded joined container.

Each of the mandrels is movable vertically on a shaft which is stationary with respect to its own axis but which revolves about the central axis of the spin welder unit 32. The shafts for the upper mandrels 150 are designated 184 and the shafts for the lower mandrels 152 are designated 186. Each upper mandrel shaft 184 extends downwardly from a support member 188, and each lower mandrel shaft 186 extends upwardly from a support member 190. These support members 188 and 190 are carried by main rotating shaft 166 at the center of the spin welder, so that the mandrel shafts 184 and 186 revolve about the central axis of the spin welder 32. The rotational movement of the shafts 184 and 186 about the spin welder central axis causes the mandrels 150 and 152 to rotate therewith.

Vertical movements of the mandrels with respect to their shafts 184 and 186 are achieved by means of connecting rods 192 and 194 operatively connected to the mandrels 150 and 152, respectively. These connecting rods have cam followers cooperating with the previously mentioned stationary cam tracks to vertically position the upper and lower mandrels as they rotate about the central axis of the spin welder 32. The upper connecting rod 192 has cam follower 196 thereon for traveling within the stationary upper cam track 178. The lower connecting rod 194 also has a cam follower 198 associated therewith for movement within the lower cam track 182.

Each lower mandrel 152 is additionally capable of spinning about the axis of its shaft 186 when a pulley area 200 thereof is brought into contact with the spin welder driving belt 34 (FIG. 2) during a predetermined number of degrees of the rotation of the mandrel about the central axis of the spin welder 32. For this purpose, bearing means (not shown) are interposed between each mandrel 152 and its shaft 186.

The upper vacuum supply indicated generally at 176 is suitably connected to a vacuum port which feeds to the periphery of a central opening (not shown) within the upper mandrel. The shape of this opening conforms generally to the shape of the upper container half 4. The vacuum is applied about the outer periphery of the container half 4 when it is being surrounded by the upper mandrel 150.

Figure 7:
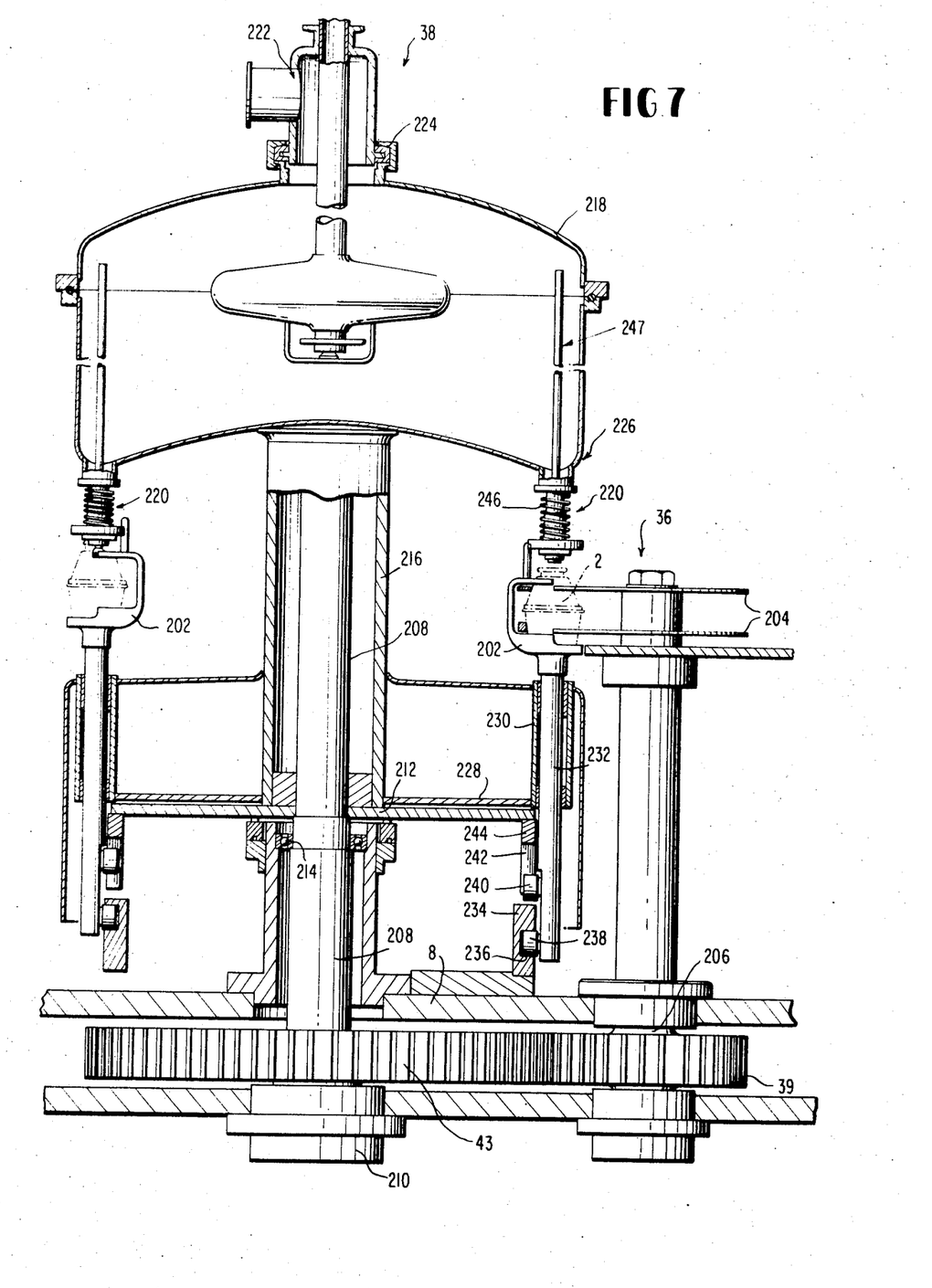
FIG. 7 is a vertical cross sectional view through the filler unit of the machine of FIGS. 1 and 2.
Figure 8:
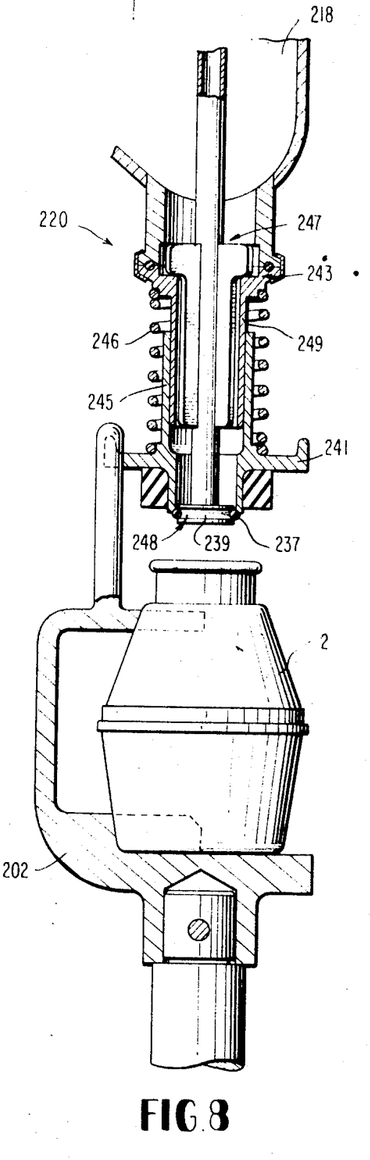
FIG. 8 is a partial sectional view illustrating the details of the filler head of the filler unit of FIG. 7.
Figure 9:
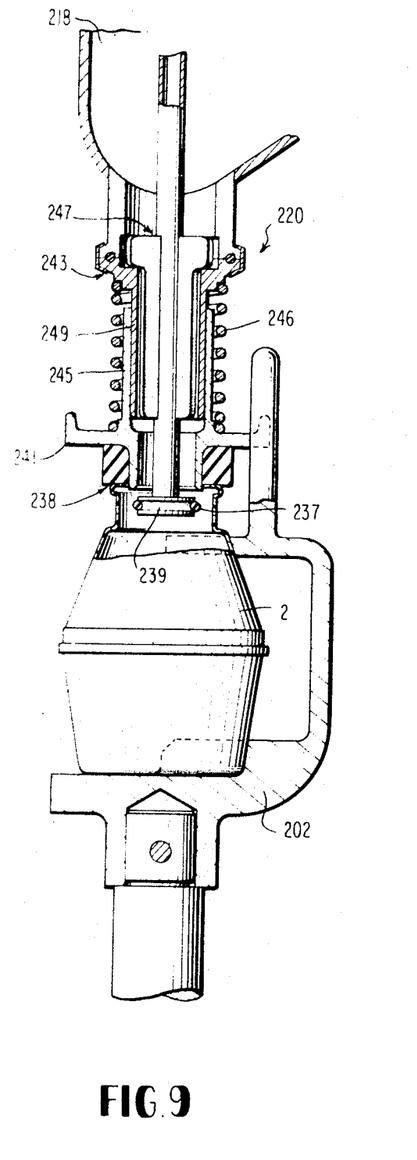
FIG. 9 is a partial sectional view showing a container being filled by the filler unit of FIG. 7.

Referring now particularly to FIGS. 7, 8 and 9, it may be seen that the joined thermoplastic containers 2 are delivered from the star wheel device 36 onto individual holders 202 for movement in a circular path about the central axis of the filler unit 38. The transfer takes place at the angular zone where the star wheel periphery moves into a position of tangency to the path followed by the several holders 202.

The star wheel device 36 includes upper and lower circular plates 204 having cutouts at their peripheries for engaging the outer peripheries of the containers 2. These plates 204 are carried by a shaft 206 extending through to a drive gear 39. This shaft 206 is journalled within bearing means carried by the frame or platform 8 and indicated generally at 208 in FIG. 7.

The star wheel drive gear 39 in turn meshes with the filler drive gear 43 attached to a shaft member 208 extending vertically upwardly through the center of the filler unit 38. This shaft is rotatable in bearing means within the housing 210 on the frame 8, and attached to the shaft for rotation therewith is a frame member 212. The shaft 208 also rotates within bearing means 214 disposed between the shaft 208 and an upwardly extending portion of the platform 8. The frame member 212 has disposed thereon a hollow cylindrical member 216 which extends upwardly about the shaft 208 and provides additional support for the rotatable portion of the filler unit 38.

A supply tank 218 is supported for rotation above the shaft 208 and the member 216. This tank 218 is generally filled to a predetermined level, with milk for filling the containers 2, in a manner to be described in more detail subsequently. The tank includes a plurality of filler heads 220 rotated with the tank 218 by the shaft 208. An external supply inlet member is provided at 222 to keep the tank 218 continuously filled. The supply inlet 222 includes a sealing member 224 disposed intermediate the inlet 222 and the tank 218. Since the tank 218 rotates during filling operations, and the inlet member 222 remains stationary, the seal is of a type suitable for preventing leakage of milk or the like during container processing.

The tank 218 is provided with a generally downwardly sloping bottom which has its lowest areas disposed at 226, to insure that the filler heads are constantly supplied with fluid. The operation of the filler heads 220 will be more fully described subsequently with reference to FIGS. 8 and 9, however it would be helpful at this point to briefly describe their operation. The container 2 when received from the star wheel 36 is spaced from the filler head 220 as shown on the right of FIG. 7. As the filler unit 38 rotates the container 2 on its platform 202 is raised into abutment with the filler head 220. The container 2, as can be seen on the left of FIG. 7, upwardly urges the filler head 220 into filling position, which in turn results in charging of the container with a measured portion of fluid.

Attached to the member 216 through outwardly extending strut means 228 are cylindrical members or sleeves 230 disposed at spaced locations about the central axis of the filler 38. These cylindrical members 230 are spaced regularly about the central axis of the unit and each of them is located beneath one of the individual filler heads 220.

Within each of the cylindrical members 230 there is slidably mounted a supported rod 232 which protrudes below the lower end of the cylindrical member. A stationary cam member 234, similar to those previously discussed with reference to the spin welder and denester, is attached to the frame 8 and has a cam track 236 at its periphery for cooperating with cam follower rollers 238 carried by the lower end portions of the several support rods 232. This cam track 236 is shaped to move each of the support rods 232 up and then down during each revolution of the rod about the central axis of the shaft 208.

Each of the support rods 232 also carries a guide roller 240 which rides in a vertical slot 242 provided in a member 244 secured to the plate 212 attached to the lower end of the rotating sleeve 216. Each slot 242 is of course always adjacent a particular one of the support rods 232, because both the plate 212 and the strut means 228 rotate together about the axis of the central shaft. However, the disposition of the guide rollers 240 within the vertical guide slots 242 prevents the support rods 232 from rotating about their own individual axes during operation of the machine, and there is no danger that inadvertent rotation of a support rod 232 about its own axis might move its cam follower roller 238 out of the desired relationship with respect to the cam track 236.

Referring to FIGS. 8 and 9 there are shown detailed views of the filler head 220. The filler head 220 comprises a downwardly extending cylindrical neck 249 which is telescoped within a container engaging member 245. A compression spring 246 encircles the neck 249 and the member 245. The spring is secured to a lower portion of the tank at 243 and acts against a protruding lip 241 to normally downwardly urge the member 245.

A vent tube 247 having a sealing member 248 on a lower end thereof extends within the tank 218 above a predetermined liquid level. This vent 247 is suitably secured within the tank. The sealing member 248 is provided with an annular groove 239 about its periphery which receives an O-ring 237 thereabout. This O-ring (see FIG. 8) presses against the lower open end of the member 245 which is downwardly biased by the spring 246, thus stopping fluid flow from the tank 218.

The holder 202 having the container 2 thereon is shown in filling relationship with the head 220 in FIG. 9. The lip of the container abuts a collar 238 disposed below the lip 241. This upward abutment urges the member 245 upwardly to telescope about the neck 249. The spring 246 is somewhat compressed during this filling operation. The sealing member 248 on the vent tube 247, however, remains fixed, thereby allowing fluid to flow about the member 248 and into the empty container 2. Provision is made to insure that the proper amount of fluid fills each container.

After the container has been filled by an associated filler head, the shape of the cam track 236 is such that the cam follower 238 and the associated parts begin to move downwardly. The container holder 202 is returned to a level appropriate for the transfer of one filled container to the star wheel 40 which delivers the container to the sealer unit 46 of the machine. Closure members 52 are deposited onto one filled container, through the agency of the mechanism 44, as they are carried by the star wheel 40 (FIG. 2).

The filled plastic containers 2 with closure members or caps 52 resting thereon are delivered from the star wheel device 40 onto individual container holders 54 mounted for movement in a circular path about the central axis of the sealer unit 46. The container holders 54 which move the containers about the axis of the sealer unit 46 thus function as carrier stations, being generally evenly circumferentially spaced about the axis of the sealer unit.

At this juncture, it may be noted that, according to the present invention, each of the processing means is comprised of a rotatable processing unit (i.e., the top and bottom denester units 12 and 24, the spin welder unit 32, the filler unit 38, and the heat sealer unit 46). Moreover, all of the rotatable processing units are mounted for rotation on the platform 8 for rotation about the respective unit axes. As in the case of the container holders 54 of the sealer unit 46, each processing unit includes a plurality of circumferentially spaced carrier stations for moving container means (comprised of individual container section or joined sections forming containers, depending upon the stage of processing) about the unit axis of rotation. The circumferential spacing of these carrier stations is substantially the same at each of the units 12, 24, 32, 38 and 46.

Returning again to a discussion specifically of the sealer unit 46, it will be appreciated that transfer of the containers from the star wheel device 40 onto the container holders 54 takes place, of course, at the angular zone where the star wheel periphery moves into a position of tangency to the path followed by the several holders 54, and the transfer is assisted by conventional stationary guide rails 56 partially illustrated in FIG. 1. The entrance end portions of the guide rails 56 intersect the path of the containers on the star wheel 40 and cause the containers to be shifted onto the holders 54 rather than permitting them to continue to move about the axis of the star wheel.

The star wheel device 40 includes upper and lower circular plates 250 having cutouts at their peripheries for engaging the outer peripheries of the containers 2. These plates 250 are carried by a shaft 252 extending through a stationary cylindrical member 254 and being connected at its lower end portion to a drive gear 47. This shaft 252 is journalled within bearing means carried by the frame or table 8 and indicated generally at 256 in FIG. 8.

Recalling prior discussions of the various processing operations performed, it may be emphasized that the star wheel device 40 and the other star wheel devices of the system may be considered to be a plurality of spaced transfer means disposed intermediate and adjacent the various processing units 12, 24, 32, 38 and 46. These transfer means are operative to receive container means from and deliver container means to the processing units at transfer zones defined generally tangentially of each of the rotatable processing units and are adjacently disposed at one of the transfer means.

As in the case of the transfer means provided by the star wheel device 40 adjacent the sealer unit 46, each of the transfer means is rotatably mounted on the platform 8. Also, each includes a plurality of circumferentially spaced carrier stations by superposed generally circular plates (E.G. 250) provided with generally semicircular peripheral cutouts. These cutouts of the respective plates are superposed and the circumferential spacing of the carrier stations of the transfer means is substantially the same throughout the system and substantially the same as that of the carrier stations of the rotatable processing units.

Each of the transfer means cooperates with a lower platform (e.g., 251 in FIG. 10) during movement of the container means about the axis of the transfer means. It should, however, be noted that in the case of the star wheel 18 (FIG. 5) associated with the denester units 12 and 24, an intermediate platform 30 is provided since the container sections are not yet joined.

Referring again to a discussion of the processing stage at the sealer unit, it may be noted that the drive gear 47 for the star wheel 40 is part of a gear train which interconnects all of the rotating components of the machine of FIGS. 1 and 2. For example, in a preferred machine there is a power input to a drive gear for the filler unit 38, and this drive gear (FIG. 3) meshes with and transmit power to the star wheel drive gear 47.

The star wheel drive gear 47 in turn meshes with a heat sealer drive gear 53 attached to a hollow drive shaft 258 extending upwardly through the center of the heat sealer unit 46. This hollow shaft is rotatable in bearing means within housing 260 on the frame 8, and within the rotating shaft 258 there is another shaft (not shown) which is attached to the lower bearing housing 260 and held stationary thereby.

At its upper end the center stationary shaft supports a stationary armature assembly 262 which is a part of an electrical supply system for the heater means of the unit. This heater includes an annular member 264 of some appropriate heat conducting material such as aluminum. Electrical resistance means 266 extend entirely around the upper portion of the annular member 264 and are secured in place by an overlying plate 268 attached to the annular member 264 by suitable screw means or the like. Leads 270 extend upwardly from the electrical resistance means 266 and are connected electrically to brush devices 272 cooperating with the stationary armature assembly 262.

The annular heater made up of the members 264 and 268 is connected to a plurality of posts 274 which extend downwardly from a base plate 276 of a dome structure 278 at the top of the heat sealing unit 46. This base plate 276 is attached to the rotating shaft 258 so as to rotate therewith and so as to be held at a predetermined level above the frame 8 of the machine. The base plate 276 of the dome structure also serves to support the brush devices 272 and cause them to rotate about the armature assembly 262 as the shaft 258 rotates.

With this arrangement, it will be seen that the lower surface of the annular heater member 264 does not move up or down but does move about the axis of the shaft 258 at the same rate that the shaft itself rotates. The electrical resistance means 266 also rotates about the axis of the shaft 258 and is continuously supplied with power through the brushes 272.

Also attached to the base plate 276 of the dome structure 278 is a depending sleeve 280 coaxial with the central shaft 258. Strut means 282 extend outwardly from the sleeve 280 at locations spaced about the axis thereof to support cylindrical members 284. These cylindrical members 284 are spaced regularly about the central axis of the unit and each of them is disposed beneath a portion of the heater 264.

Within each of the cylindrical members 284 there is slidably mounted a supported rod 286 which protrudes below the lower end of the cylindrical member. A stationary cam member 288 is attached to the upper bearing housing 260 and has a cam track 290 at its periphery for cooperating with cam follower rollers 292 carried by the lower end portions of the several support rods 286. This cam track 290 is shaped to move each of the support rods 286 up and then down during each revolution of the rod about the central axis of the shaft 258.

Each of the support rods 288 also carries a guide roller 294 which rides in a vertical slot 296 provided in a member 298 secured to a plate 300 attached to the lower end of the rotating sleeve 280. Each slot 296 is of course always adjacent a particular one of the support rods 286, because both the plate 300 and the struts 282 rotate together about the axis of the central shaft. However, the disposition of the guide rollers 294 within the vertical guide slots 296 prevents the support rods 286 from rotating about their own individual axes during operation of the machine, and there is no danger that inadvertent rotation of a support rod 286 about its own axis might move its cam follower roller 292 out of the desired relationship with respect to the cam track 290.

Figure 10:
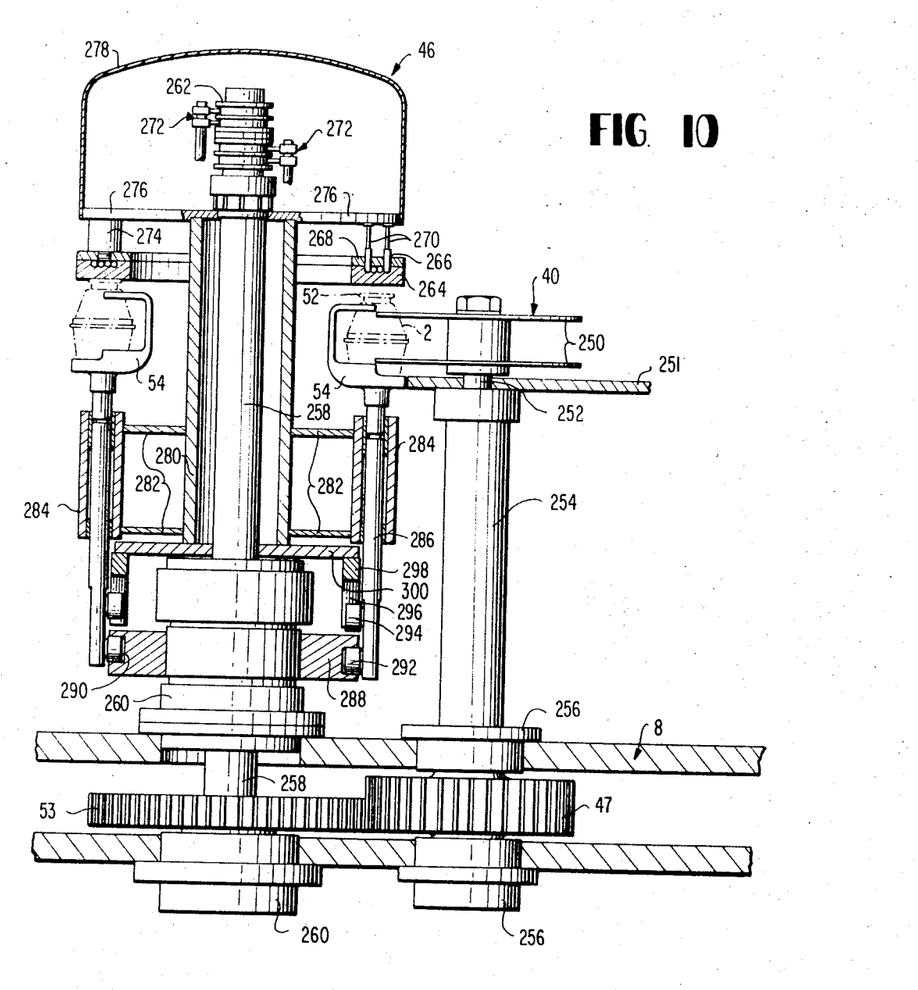
FIG. 10 is a vertical cross sectional view of the bottle closure sealing unit of the machine of FIGS. 1 and 2.

The operation of the heat sealing apparatus of FIG. 10 should now be evident. Each filled container 2 having a closure member 52 resting upon its upper lip is delivered from the star wheel device 40 onto one of the container holders 54 where it is supported and prevented from tipping. As this container holder 54 moves along its circular path around the central axis of the shaft 258, the support rod 286 associated therewith will of course also move through a circular path about the central axis of the shaft 258. In doing so, the support shaft 286 will cause its cam follower roller 292 to move along the cam track 290.

The cam track 290 has a configuration such that the roller 292 will move upwardly from the position it occupies at the time when a container is delivered to its container holder 54. Upward movement of a support rod 286 tends to move the container holder 54 sufficiently to press the container closure 52 against the downwardly facing surface of the annular heater 264.

After the container cap has been pressed a prescribed time against the heater, the shape of the cam track 290 is such that the cam follower 292 and the associated parts begin to move downwardly. The cap moves out of heat conducting relationship with the heater 264, and the container holder 54 is returned to a level appropriate for the transfer of the sealed container to the star wheel 48 which delivers the container to the output conveyor 50 of the machine.

As will thus be apparent, beginning with the input of the container sections at the denester 12 and 24 and ending with the transfer of the sealed containers to the output conveyor 50, all the rotatable processing units and transfer means are pitch line gear driven by gear means for simultaneous rotation. The gearing of the processing units and transfer means together is accomplished so that the carrier stations of each of the processing units and an adjacently disposed transfer means rotate in opposite angular directions.

Although the invention has been described in connection with a particular preferred form thereof, it will be appreciated by those skilled in the art that additions, modifications, substitutions and deletions may be made without departing from the spirit and scope of the invention as defined in the appended claims.

What is claimed is:

1. A combination for performing a plurality of successive processing operations utilizing a plurality of container elements adapted to form containers, the processing operations including dispensing of container elements and forming, filling, and sealing the containers, the machine comprising:

first processing means for dispensing container elements;

second processing means for forming containers from the container elements, said second processing means being spaced from said first processing means;

first rotatable transfer means for transferring said container elements from said first processing means to said second processing means;

third processing means for filling the containers, said third processing means being spaced from said second processing means;

second rotatable transfer means for transferring said containers from said second processing means to said third processing means;

fourth processing means for sealing the filled containers, said fourth processing means being spaced from said third processing means; and third rotatable transfer means for transferring said containers from said third processing means to said fourth processing means;

each of said transfer means including means for stabilization of said containers or elements against tipping during transfer, and constant pitch drive means for maintaining constant pitch between said containers or elements throughout transfer from one of said processing means to another of said processing means and throughout said processing operations.

2. A machine for performing a plurality of successive processing operations with container means comprised of individual container sections or joined container sections forming containers, the processing operations including the dispensing of container sections and the assembly, filling, and sealing of the containers, the machine comprising:
a platform;
a plurality of spaced processing means for performing said operations, each of said processing means being comprised of a processing unit rotatably mounted on said platform and including a plurality of circumferentially spaced carrier stations for moving said container means about the axis of rotation of the associated one of said processing units;
a plurality of spaced transfer means disposed intermediate and adjacent said processing units for receiving said container means from and delivering said container means to said processing units at transfer zones defined generally tangentially of each of said rotatable processing units and an adjacently disposed one of said rotatable transfer means, each of said transfer means being rotatably mounted on said platform and including a plurality of circumferentially spaced carrier stations for moving said container means about the axis of rotation of the associated one of said transfer means;
the circumferential spacing of said carrier stations on each of said transfer means and said processing units being substantially the same;
gear means gearing said transfer means and said processing units together for simultaneous rotation with said carrier stations of each of said processing units and an adjacently disposed transfer means rotating in opposite angular directions; and
initial ones of said processing units being comprised of first and second dispensing means for supplying individual container sections to an adjacent one of said transfer means.

3. The machine according to claim 2 wherein:
said rotatable transfer means each comprise rotatable star wheel transfer means, and said first and second dispensing means for respectively supplying upper and lower container sections to an adjacent one of said star wheel transfer means, and wherein said adjacent one of said rotatable star wheel transfer means comprises superposed star wheel transfer sections for respectively and successively receiving said upper and lower container sections in superposed relationship.

4. The machine according to claim 3 wherein said superposed star wheel transfer sections are comprised of superposed container means receiving plates and said carrier stations on said one rotatable star wheel transfer means are comprised of superposed sets of generally semi-circular cutouts defined in the periphery of said receiving plates.

5. The machine according to claim 2 wherein:
said carrier stations of said first and second dispensing means each comprise means for supplying container sections to an adjacent one of said transfer means from generally vertical nests of container sections.

6. The machine according to claim 1 wherein said carrier stations of said second dispensing means further comprise generally vertically movable means for denesting said container sections.

7. A compact automatic bottling machine for performing a plurality of successive processing operations with container means comprised of individual container sections forming containers, the machine comprising:
first processing means having a supply of upper container sections associated therewith for dispensing said upper container sections one by one from the supply thereof;
second processing means having a supply of lower container sections associated therewith for dispensing said lower container sections one by one from the supply thereof;
first star wheel transfer means disposed intermediate and adjacent said first and second processing means for tangentially receiving said dispensed container sections and delivering said container means to a subsequent processing operation;
said first star wheel transfer means further maintaining vertical alignment of said upper and lower container sections;
third processing means for spin welding having facing container means holding mandrels tangentially receiving said vertically aligned container sections from said first star wheel transfer means and joining said container halves to form a unitary container;
second star wheel transfer means disposed adjacent said third processing means for tangentially receiving said unitary containers and delivering said containers to a subsequent processing operation;
fourth processing means for filling said containers, said fourth processing means tangentially receiving said container means from said second star wheel transfer means and supplying fluid into said containers;
third star wheel transfer means for tangentially receiving said fluid filled container means and said third transfer means having a closure dispenser associated therewith,
said closure dispenser individually placing a closure on said filled containers while said containers are traveling about said third star wheel transfer means;
fifth processing means for tangentially receiving said container means from said third rotatable star wheel transfer means and hermetically sealing a closure onto said filled containers;
fourth star wheel transfer means for tangentially receiving said sealed container means and delivering said container means to an output conveyor;
said processing means and said transfer means including a plurality of circumferentially spaced carrier stations for moving said container means about the axis of rotation of the associated one of said processing and transfer means;
the circumferential spacing of said carrier stations on each of said transfer means and said processing means being substantially the same;
gear means gearing said transfer means and said processing means together for simultaneous rotation with said carrier stations of each of said processing means and an adjacently disposed transfer means rotating in opposite angular directions; and said processing means and said transfer means being rotatable upon a common platform.

8. A method of processing thermoplastic container means comprised of individual container sections or joined container sections forming containers including the steps of:
- denesting first container sections from a first rotating supply one by one;
- denesting second container sections from a second rotating supply one by one;
- tangentially delivering said first and second denested container sections to a rotating star wheel and vertically aligning said sections;
- assembling said sections by friction welding within a spin welding unit to form a joined container;
- tangentially delivering said container from a spin welder to a rotating filler assembly;
- filling said containers within the rotating filler assembly;
- tangentially delivering said filled container from said rotating filler assembly to a subsequent rotating sealer unit processing step; and
- sealing a closure member onto the filled container with the rotating sealer unit.

* * * * *